US010474983B2

(12) United States Patent
High et al.

(10) Patent No.: US 10,474,983 B2
(45) Date of Patent: Nov. 12, 2019

(54) METHOD AND APPARATUS FOR DISPATCHING AN AIRBORNE DRONE TO CARRY AN ITEM TO A CUSTOMER

(71) Applicant: Walmart Apollo, LLC, Bentonville, AR (US)

(72) Inventors: Donald R. High, Noel, MO (US); John P. Thompson, Bentonville, AR (US); Michael D. Atchley, Springdale, AR (US); Chandrashekar Natarajan, Valencia, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 335 days.

(21) Appl. No.: 15/344,095

(22) Filed: Nov. 4, 2016

(65) Prior Publication Data

US 2017/0132562 A1 May 11, 2017

Related U.S. Application Data

(60) Provisional application No. 62/252,075, filed on Nov. 6, 2015.

(51) Int. Cl.
*G06Q 10/08* (2012.01)
*B64C 39/02* (2006.01)
(Continued)

(52) U.S. Cl.
CPC .......... *G06Q 10/0833* (2013.01); *B64B 1/40* (2013.01); *B64C 39/024* (2013.01);
(Continued)

(58) Field of Classification Search
CPC .. G06Q 10/083; G06Q 10/0835; G06Q 50/28; B64F 1/007; B64F 1/02;
(Continued)

(56) References Cited

U.S. PATENT DOCUMENTS 9,550,577 B1    1/2017  Beckman
9,573,684 B2    2/2017  Kimchi
(Continued)

FOREIGN PATENT DOCUMENTS

WO    2014080385    5/2014

OTHER PUBLICATIONS

"Horsefly, the new Postal service delivery with drones combined with trucks," by W. Master, Apr. 24, 2015. (Year: 2015).*
(Continued)

*Primary Examiner* — Kevin H Flynn
*Assistant Examiner* — Brian Adams Heflin
(74) *Attorney, Agent, or Firm* — Fitch, Even, Tabin & Flannery, LLP

(57) ABSTRACT

A control circuit dispatches towards a delivery zone a terrestrial vehicle that carries at least one airborne drone and at least one item to be delivered to a customer. When the terrestrial vehicle is in the delivery zone, the drone is dispatched to carry the item to the customer. By one approach the drone exits the terrestrial vehicle without bearing the item. The item can be automatically moved from within the terrestrial vehicle to a position such that the item is at least partially exposed external to the terrestrial vehicle. The airborne drone, subsequent to exiting the terrestrial vehicle, can engage the item in order to then deliver that item to the customer. By one approach the terrestrial vehicle includes one or more platforms that support one or more airborne drones and that can be moved from within the terrestrial vehicle to a deployed position external to the terrestrial vehicle.

10 Claims, 5 Drawing Sheets

(51) Int. Cl.
*B64F 1/00* (2006.01)
*B64B 1/40* (2006.01)
(52) U.S. Cl.
CPC .. *B64C 2201/024* (2013.01); *B64C 2201/027* (2013.01); *B64C 2201/108* (2013.01); *B64C 2201/127* (2013.01); *B64C 2201/128* (2013.01); *B64C 2201/141* (2013.01); *B64C 2201/208* (2013.01); *B64F 1/007* (2013.01)
(58) Field of Classification Search
CPC .... B64F 1/025; B64F 1/04; B64F 1/06; B64F 1/08; B64F 1/10; B64F 1/12; B64F 1/22; B64F 1/222; B64F 1/228; B64F 1/28; B64F 1/305; B64F 1/31; B64F 1/32; B64F 1/34; B64F 1/362; B64F 1/368; B64F 5/00; B64F 5/10; B64F 5/40; B64F 5/60; B64F 3/02; G05B 2219/2659; G05B 2219/45014
See application file for complete search history.

(56) References Cited

U.S. PATENT DOCUMENTS

| | | | | |
|---|---|---|---|---|
| 9,656,805 | B1* | 5/2017 | Evans | G06Q 10/087 |
| 9,928,474 | B1* | 3/2018 | Evans | G06Q 10/083 |
| 2005/0051667 | A1 | 3/2005 | Arlton | |
| 2013/0240673 | A1 | 9/2013 | Schlosser | |
| 2014/0032034 | A1 | 1/2014 | Raptopoulos | |
| 2014/0254896 | A1 | 9/2014 | Zhou | |
| 2014/0303814 | A1 | 10/2014 | Burema | |
| 2015/0120094 | A1 | 4/2015 | Kimchi | |
| 2015/0277440 | A1 | 10/2015 | Kimchi | |
| 2016/0196755 | A1 | 7/2016 | Navot | |
| 2016/0200438 | A1* | 7/2016 | Bokeno | B64C 39/024 244/2 |
| 2016/0257401 | A1 | 9/2016 | Buchmueller | |
| 2016/0272317 | A1* | 9/2016 | Cho | G08G 1/09 |
| 2016/0364989 | A1* | 12/2016 | Speasl | G08G 5/0034 |
| 2017/0110017 | A1 | 4/2017 | Kimchi | |
| 2017/0121023 | A1* | 5/2017 | High | B64C 39/024 |
| 2017/0316701 | A1* | 11/2017 | Gil | H04W 4/70 |

OTHER PUBLICATIONS

"UPS wants UAV's to cover the 'last mile' deliveries," by Andrew Tarantoia, Feb. 21, 2017. (Year: 2017).*
"As drone technology threatens to redefine the courier industry, FedEx's SVP of integrated marcomms delivers key strategies to further establish the brand's global reputation," by Washkuch, Frank, PR Week(US), vol. 18, Issue 1, Jan. 2015. (Year: 2015).*
Coworth, Ben; "HorseFly Delivery Drone Would Use a Van as its Base-on-the-Go;" New Atlas; Jun. 6, 2014; 7 pages; published at http://newatlas.com/horsefly-uav-delivery-drone/32441/.
"HorseFly"; http://workhorse.com/aerospace; published Feb. 2017; pp. 1-6.
Emspak, Jesse; "Electric Trucks Plus Drones Could Make Deliveries 'Green'"; https://www.livescience.com/48510-delivery-drones-electric-trucks.html; Oct. 29, 2014; pp. 1-5.
Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; publsihed Dec. 9, 2015; pp. 1-3.
Workhorse Group; "HorseFly by Workhorse—Drone Delivery Concept"; https://www.youtube.com/watch?v=epqZ-luhzKQ; published on Oct. 13, 2015; pp. 1-8.

* cited by examiner

METHOD AND APPARATUS FOR DISPATCHING AN AIRBORNE DRONE TO CARRY AN ITEM TO A CUSTOMER

CROSS-REFERENCE TO RELATED APPLICATION

This application claims the benefit of U.S. Provisional Application No. 62/252,075, filed Nov. 6, 2015, and is incorporated herein by reference in its entirety.

TECHNICAL FIELD

These teachings relate generally to delivering items to customers and more particularly to the use of airborne drones to accomplish the delivery.

BACKGROUND

Increasingly, retail customers opt for home delivery of their purchases. In many cases these purchases are conducted via an on-line experience. In other cases the customer makes a purchase while on-site at a retailer's physical location but arranges for delivery of the purchased product to an address of their choice. The foregoing applies as well to business customers who arrange for delivery of purchased items to their selected business address.

Prior art practices have long encompassed effecting such deliveries via a public service (such as the United States Postal Service) or a private service (such as the United Parcel Service or FedEx). These services typically arrange for delivery of such items via a truck or other terrestrial vehicle and the corresponding driver or other delivery person. In more recent times suggestions have been made to employ airborne drones to effect such a delivery. Unfortunately, numerous obstacles hamper such an approach.

For example, federal regulators in the United States (and state-based authorities elsewhere in the world) impose numerous restrictions and conditions upon the commercial use of airborne drones. As another example, airborne drones are typically powered by batteries and hence often have a very limited flight range. As yet another example, it can be challenging to safely and reliably navigate a product-bearing airborne drone over a lengthy distance.

BRIEF DESCRIPTION OF THE DRAWINGS

The above needs are at least partially met through provision of the method and apparatus for dispatching an airborne drone to carry an item to a customer described in the following detailed description, particularly when studied in conjunction with the drawings, wherein.

Figure 1:
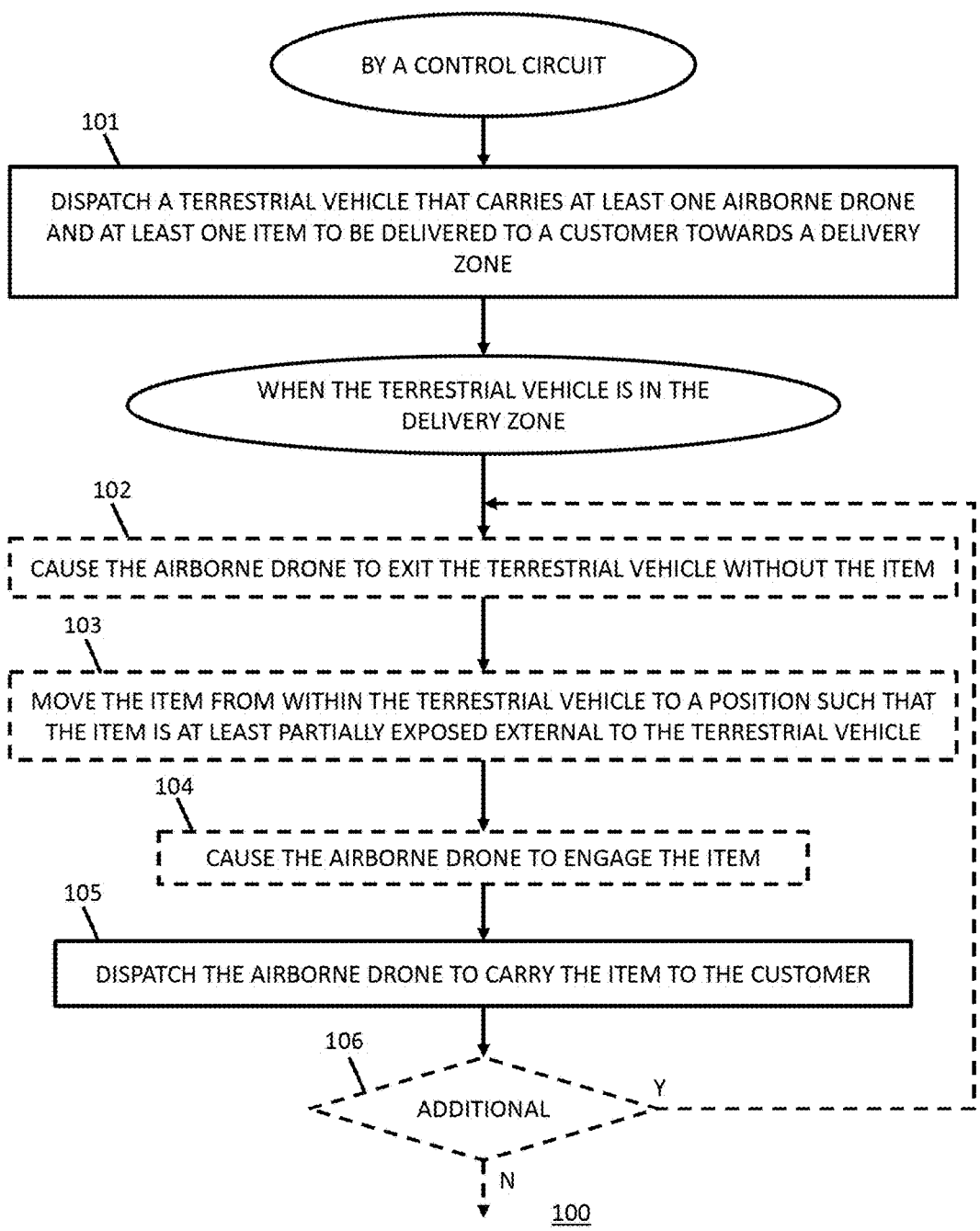
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit dispatches a terrestrial vehicle that carries at least one airborne drone and at least one item to be delivered to a customer towards a delivery zone. When the terrestrial vehicle is in the delivery zone, the airborne drone leaves the terrestrial vehicle and carries the item to the customer.

By one approach the airborne drone exits the terrestrial vehicle without bearing the item. Meanwhile, the item can be automatically moved from within the terrestrial vehicle to a position such that the item is at least partially exposed external to the terrestrial vehicle. So disposed, the airborne drone, subsequent to exiting the terrestrial vehicle, can engage the item in order to then deliver that item to the customer.

By one approach the terrestrial vehicle includes one or more platforms that support one or more airborne drones and that can be moved from within the terrestrial vehicle to a deployed position external to the terrestrial vehicle. So configured the supported airborne drones can then take off without requiring a particularly careful lift off and horizontal transitioning in order to exit the terrestrial vehicle.

These teachings will facilitate so dispatching a plurality of airborne drones carrying corresponding items to be delivered to a same or different customers within a delivery zone. Following a successful delivery the airborne drones can then return to the terrestrial vehicle and land, for example, upon an extended platform that can then be withdrawn into the terrestrial vehicle. The terrestrial vehicle can then facilitate additional such deliveries in the same delivery zone or can move to a different delivery zone to effect one or more deliveries there.

So configured, these teachings permit the use of airborne drones to deliver items to a customer without necessarily requiring the airborne drone to traverse a lengthy and possibly difficult distance. Accordingly, these teachings are very conservative with respect to consuming a portable power supply on such airborne drones and also greatly increase both perceived and actual safety as well.

Figure 2:
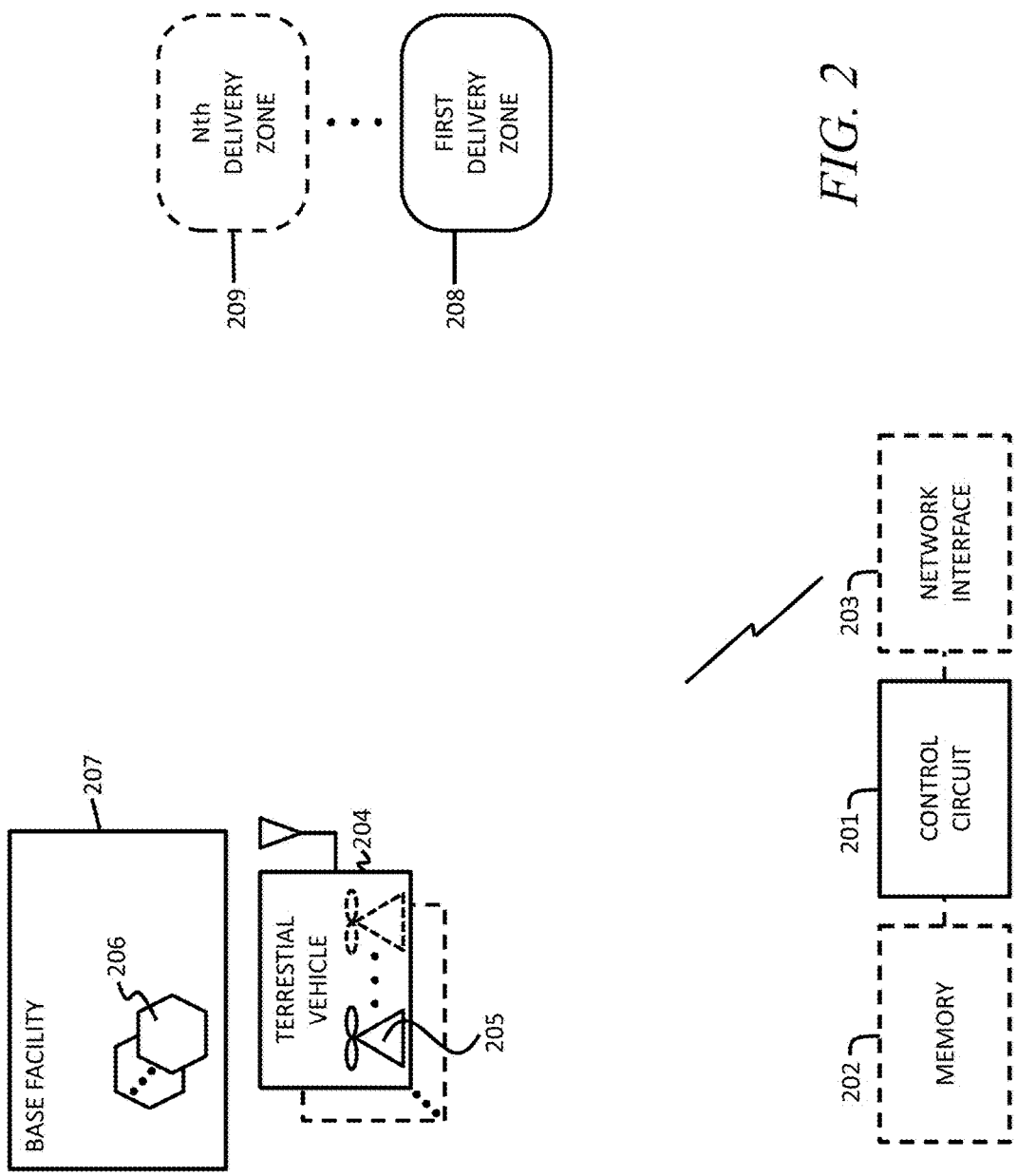
FIG. 2 comprises a block diagram as configured in accordance with various embodiments of these teachings.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example it will be presumed here that a control circuit of choice carries at least some of the actions, steps, and/or functions of this process 100. FIG. 2 provides an illustrative example in these regards.

In this particular example, the enabling apparatus includes such a control circuit 201. Being a "circuit," the control circuit 201 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 201 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 201 is configured (for example, by using corresponding programming as will be well understood by those skilled in the art) to carry out one or more of the steps, actions, and/or functions described herein.

By one optional approach the control circuit 201 operably couples to a memory 202. This memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

In addition to whatever other information may be useful in the context of a given application setting, this memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 201 also operably couples to a network interface 203. So configured the control circuit 201 can communicate with other system components (such as the terrestrial vehicle and airborne drones described herein) via the network interface 203. Network interfaces, including both wireless and non-wireless platforms, are well understood in the art and require no particular elaboration here.

In this illustrative example there is at least one terrestrial vehicle 204. This terrestrial vehicle 204 can comprise any of a variety of vehicles including those powered by an internal combustion engine or an electric motor, horse-drawn vehicles, and even human-powered vehicles as desired. Relevant examples include automobiles, vans, and trucks of various kinds including trucks having an integral cargo-carrying area and trucks that connect to and pull a cargo-carrying trailer. Generally speaking the terrestrial vehicle 204 should be of an appropriate size and have sufficient power and cargo-carrying space to suit the usage described therein and also to operate compatibly and legally within the delivery zones described herein.

Also in this illustrative example the terrestrial vehicle 204 has one or more airborne drones 205. As used herein, the expression "airborne" is not meant to refer to a current flying status of the drone but instead serves to characterize the drone 205 as being a drone that is capable of controlled flight. This is to distinguish a flying drone from a terrestrial drone. Airborne drones are a well understood though currently growing field of endeavor. As the present teachings are not overly sensitive to any particular selections in these regards, no detailed discussion regarding the general design of airborne drones is provided here.

In this illustrative example the airborne drone 205 is presumed to itself have a control circuit that can communicate with the aforementioned control circuit 201 via an on-board network interface. The airborne drone 205 may also include one or more on-board sensors that sense one or more conditions or circumstances that the airborne drone 205 and/or the control circuit 201 can employ to develop information of interest. Examples in these regards include but are not limited to video cameras having sensitivity to various light spectra of interest, thermal sensors, proximity sensors, any of a variety of navigation aids, and so forth.

In this illustrative example the airborne drone 205 is also presumed to have a cargo-carrying capability. The present teachings are not particularly sensitive to any particular choices made in these regards. By one approach the cargo-carrying capability can include an internal compartment that can receive one or more items to be delivered to a customer. By another approach, in lieu of the foregoing or in combination therewith, the cargo-carrying capability can include something as simple as a hook to engage a cargo-carrying net to more sophisticated approaches such as mechanisms to mechanically grip an item to be delivered.

In this illustrative example the items 206 to be delivered to one or more customers are staged at a base facility 207. These teachings will accommodate a wide variety of items and any of a variety of base facilities. By one approach, for example, a retail store can itself serve as the base facility 207. By another approach, a distribution center that serves to receive and distribute goods to a variety of retail facilities but which does not itself serve as a retail shopping facility can serve as the base facility 207. These teachings will readily accommodate both permanent and temporary base facilities. During particularly busy times, such as the year-end holiday shopping season in the United States, the base facility 207 may comprise one or more trailers, pods, tents, or the like that are temporarily stationed at a convenient location.

Generally speaking, these teachings anticipate moving particular items 206 from the base facility 207 to the terrestrial vehicle 204. These teachings will accommodate a variety of logistics-planning strategies and algorithms as may suit the needs of a given application setting.

Such a base facility 207 can also serve to house and/or otherwise maintain one or more of the airborne drones 205. For example, the base facility 207 may include a battery charging station at which batteries to power the airborne drones 205 can be charged. The base facility 207 can also include various spare parts and corresponding tools to permit making at least some repairs to damaged airborne drones 205.

With continued reference to FIGS. 1 and 2, at block 101 the control circuit 201 provides for dispatching towards a delivery zone a terrestrial vehicle 204 that carries at least one airborne drone 205 and at least one item 206 to be delivered to a customer. FIG. 2 depicts a first delivery zone 208 that serves in this example as the aforementioned delivery zone. These teachings will accommodate dispatching such a terrestrial vehicle 204 to more than one such delivery zone if desired. Accordingly, FIG. 2 depicts an Nth delivery zone 209 where N comprises an integer.

Generally speaking, for many application settings the "delivery zone" will not constitute only the delivery address itself. For example, these teachings do not necessarily contemplate parking in a customer's short driveway and employing an airborne drone to deliver an item over a mere few yards. Instead, in many cases the delivery zone will constitute a geographic area that includes many potential delivery addresses (i.e., a number of different residential and/or business addresses) such as a residential neighborhood street or block, a gated community, an apartment or condominium complex (featuring one or more separate buildings), and so forth. The size of the delivery zone can vary if desired to accommodate a number of deliveries to be made within a particular area, regulatory requirements, drone logistics, and so forth.

Figure 3:
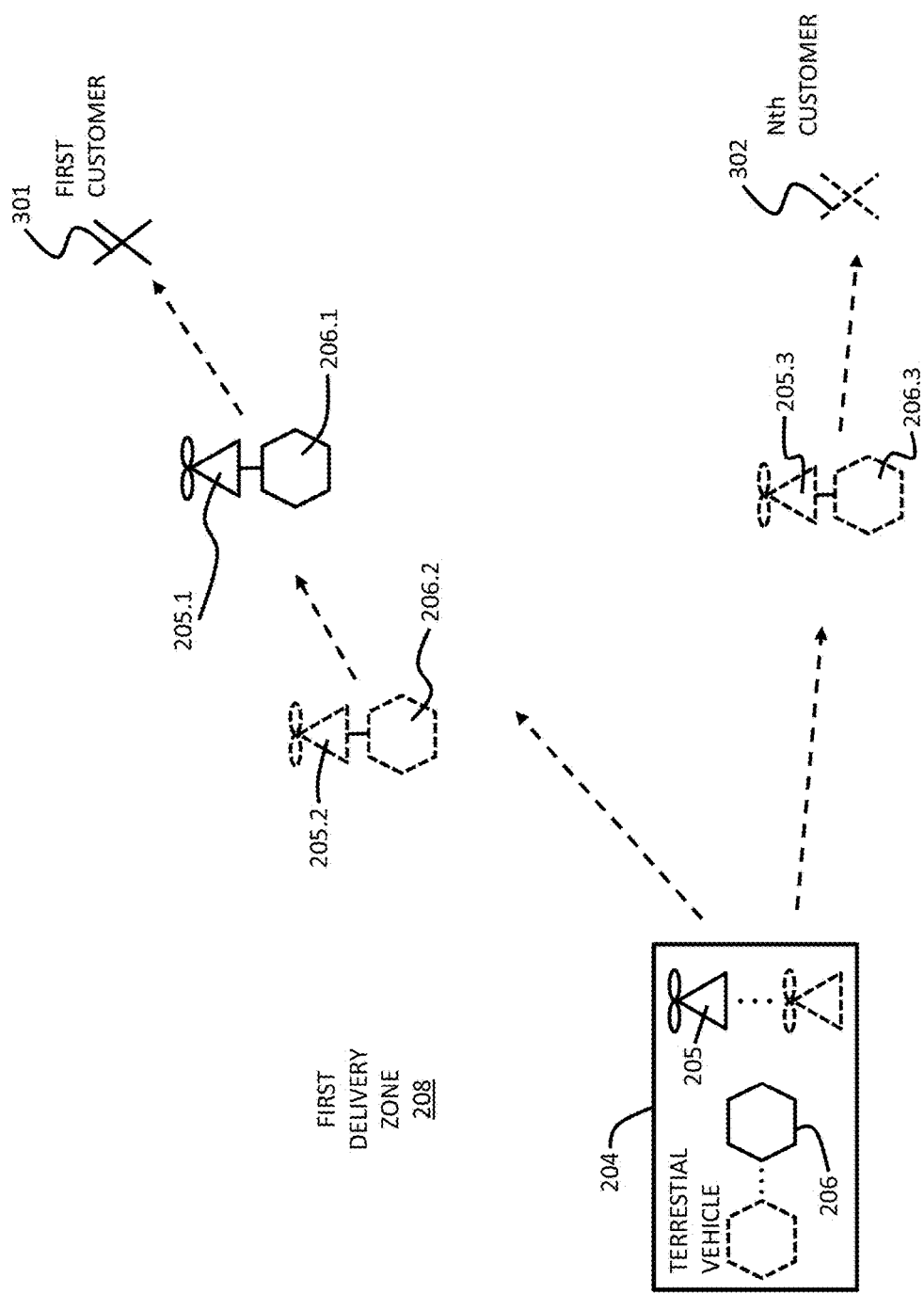
FIG. 3 comprises a block diagram as configured in accordance with various embodiments of these teachings.

With reference to FIGS. 1 and 3, the actions described next will typically take place when the terrestrial vehicle 204 is in the delivery zone (in this case the aforementioned first delivery zone 208) and presumably stationary and hence not moving. The terrestrial vehicle 204 may be stopped curbside or at a public or designated parking location. This parking location may be outside and exposed to the elements or partially or wholly covered as desired.

Figure 4:
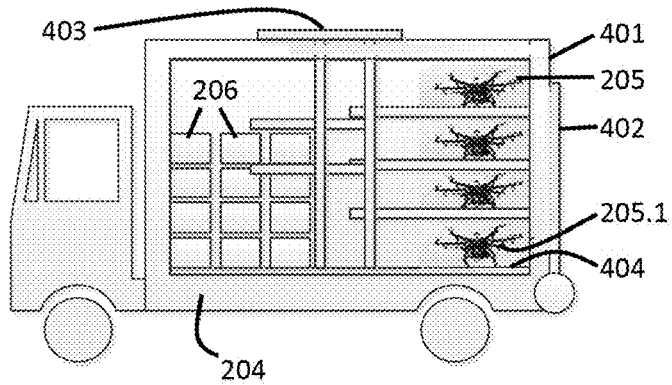
FIG. 4 comprises a schematic representation as configured in accordance with various embodiments of these teachings.

Referring momentarily to FIG. 4, in this illustrative example the terrestrial vehicle 204 comprises a truck having a backside 401 that includes a portal formed there through and a gate 402 that can, in this illustrative embodiment, pivot downwardly to a horizontal orientation. (For the sake of clarity the terrestrial vehicle 204 is shown in this illustration as though the side thereof is transparent. While such an embodiment is possible, for many application settings it will be acceptable for the sides of the terrestrial vehicle 204 to be solid and opaque.) By one approach this gate 402 can be manually pivoted between a closed and an open orientation. By another approach, if desired, this gate 402 can be controlled and manipulated by one or more motive mechanisms of choice.

In this example the terrestrial vehicle 204 also includes a plurality of movable platforms 404 that each support a separate airborne drone 205. If desired, and depending upon the relative size and configuration of each platform 404 and airborne drone 205, one or more of the platforms 404 can support more than one airborne drone 205. In this example, each of the platforms 404 can slide outwardly through the backside 401 of the terrestrial vehicle 204 through the aforementioned portal. In particular, each of these platforms 404 can be moved independently of the others back and forth between a deployed position and a withdrawn, stowed position.

With continued momentary reference to FIG. 4, the terrestrial vehicle 204 also has a sliding door 403 located atop the cargo-carrying area of the vehicle 204. As with the pivoting gate 402, these teachings will accommodate either a manually-operated sliding door 403 or an automatically-operated sliding door 403 as desired. When disposed as shown in FIG. 4, the sliding door 403 covers another portal on the top side of the terrestrial vehicle 204 through which items 206 to be delivered can be exposed and lifted as described below. Once again, these teachings will accommodate manual manipulation of the items 206 or automated manipulation of the items 206 within the terrestrial vehicle 204 to facilitate selecting a particular item 206 and moving that selected item 206 to the aforementioned top-side portal.

Figure 5:
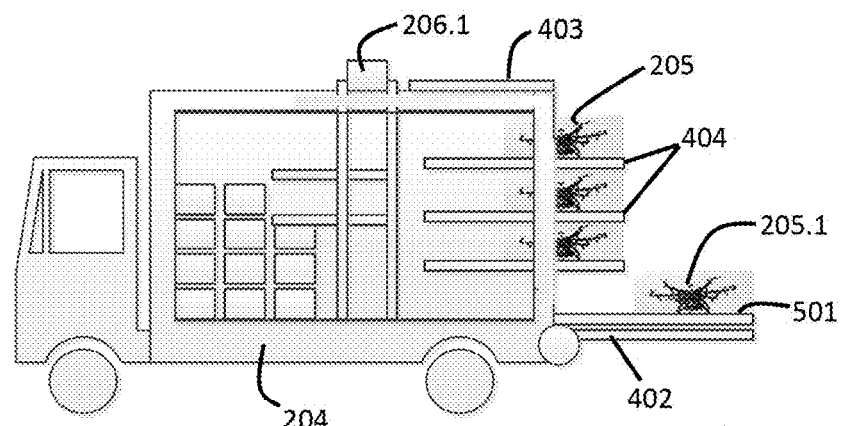
FIG. 5 comprises a schematic representation as configured in accordance with various embodiments of these teachings.

With reference to FIGS. 1 and 5, at optional block 102 this process 100 can provide for causing a first one of the airborne drones 205.1 to exit the terrestrial vehicle 204 without the item 206.1 to be delivered. In this particular illustrative example the gate 402 is pivoted outwardly and downwardly and the platform 501 upon which this airborne drone 205.1 rests has slid out to a deployed position (i.e., in this example, the platform 501 is fully extended outwardly of the terrestrial vehicle 204). (By one approach, the remaining platforms 404 upon which the remaining airborne drones 205 are resting can remain fully withdrawn inside the terrestrial vehicle 204 while this particular platform 501 fully extends to an operating position. By another approach, and as illustrated, one or more of these remaining platforms 404 can be partially extended outwardly, but not so far as to fully cover or otherwise interfere with this first airborne drone 205.1 taking off.)

At optional block 103 this process 100 can provide for moving the particular item 206.1 that is to be delivered by the first airborne drone 205.1 from being fully within the terrestrial vehicle 204 to a position such that this item 206.1 is at least partially exposed external to the terrestrial vehicle 204. In this particular illustrative example this item 206.1 has been moved from its stored position within the terrestrial vehicle 204 to a position where at least part of the item 206.1 extends outwardly of the aforementioned portal through the topside of the terrestrial vehicle 204. In this example the item 206.1 can be resting atop a small elevator platform that also serves to raise the item 206.1 to this elevated position.

Figure 6:
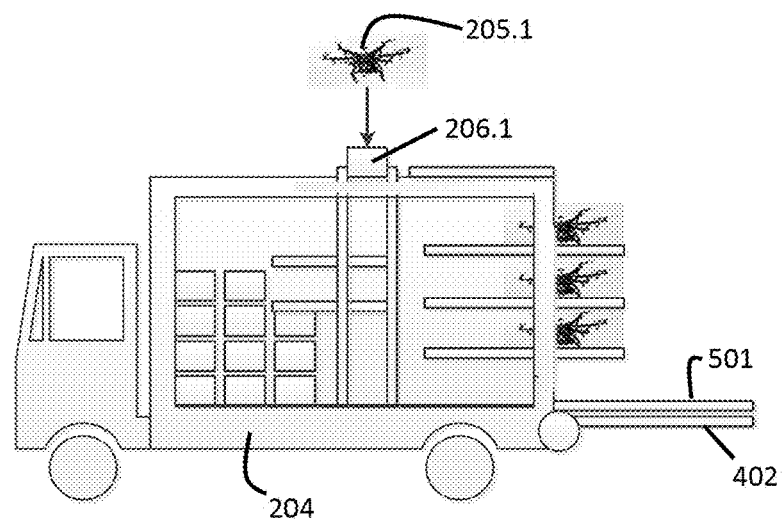
FIG. 6 comprises a schematic representation as configured in accordance with various embodiments of these teachings.

Referring now to FIGS. 1 and 6, at optional block 104 this process 100 can provide for causing the airborne drone 205.1 to engage the item 206.1 that this airborne drone 205.1 is slated to deliver within the delivery zone 208. In this illustrative example, the first airborne drone 205.1 lifts off from its platform 501 and rises upwardly and over the terrestrial vehicle 204 in order to engage the item 206.1 per the specifics of the selected engagement mechanism. There are numerous known approaches in these regards, and as these teachings are not especially sensitive to any particular selection amongst these approaches further elaboration is not provided here for the sake of brevity.

Referring now to FIGS. 1 and 3 at block 105 this airborne drone 205.1 is dispatched to carry the item 206.1 to a point of delivery 301 for a first customer. By one approach the airborne drone 205.1 can operate in a wholly or largely autonomous mode when navigating to the point of delivery 301. By another approach the airborne drone 205.1 can be directed to the point of delivery 301 via real time control executed, for example, by a remote pilot. Such options are well understood in the art and require no further elaboration here.

At optional decision block 106, additional airborne drones 205 can be similarly dispatched to carry additional items within the first delivery zone 208. As one example in these regards, when the first customer is receiving more than one item 206, additional drones 205.2 carrying such additional items 206.2 can be similarly deployed and dispatched to carry the additional item or items 206.2 to the point of delivery 301 this one customer.

Figure 7:
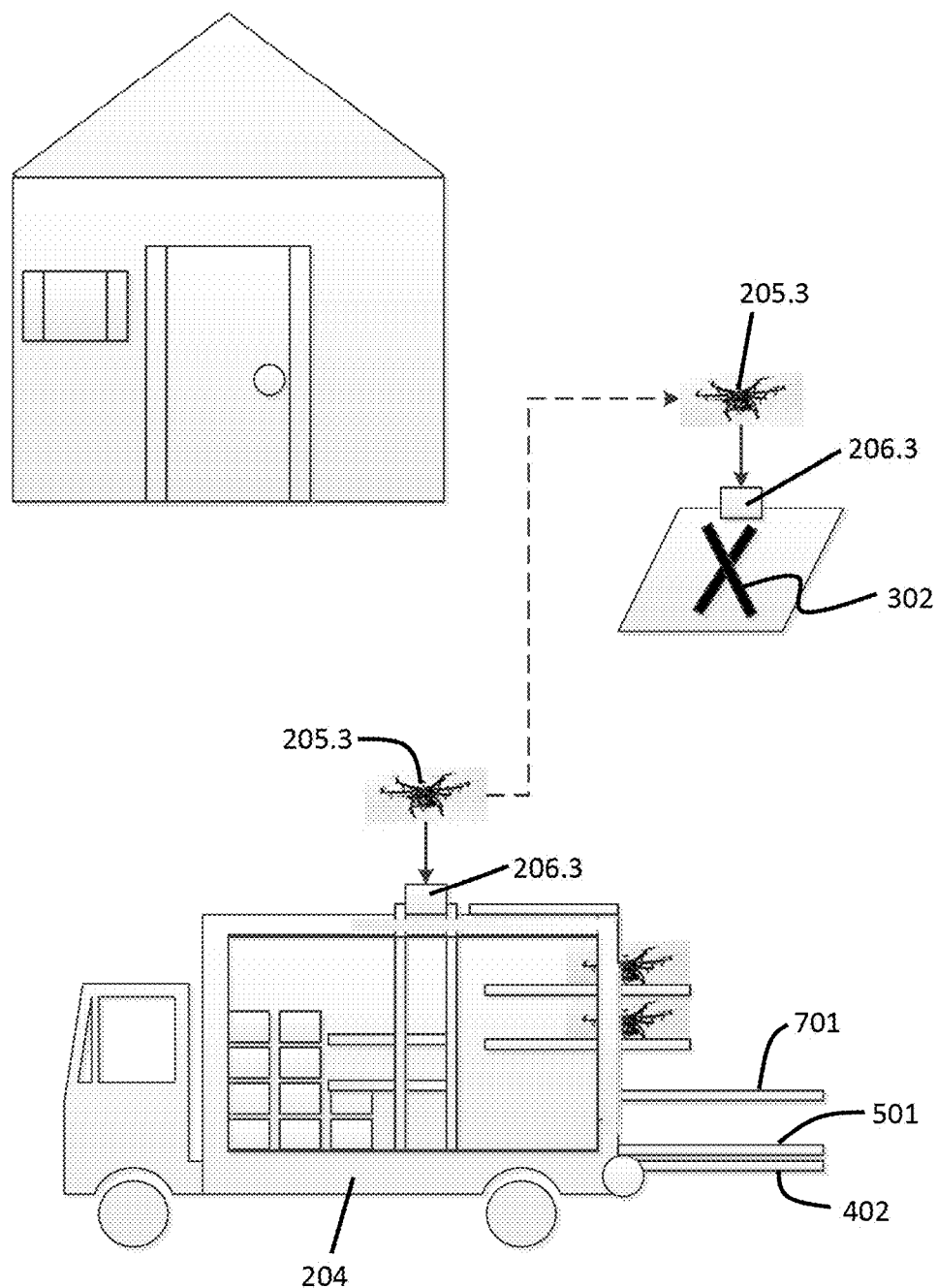
FIG. 7 comprises a schematic representation as configured in accordance with various embodiments of the invention.

As another example in these regards, when a different customer at a different point of delivery 302 within the first delivery zone 208 is to receive an item 206.3, as shown in both FIGS. 3 and 7 a corresponding airborne drone 205.3 can lift off from its support platform 701 and similarly move to the top of the terrestrial vehicle 204 to engage the item 206.3 intended for this particular customer. The airborne drone 205.3 can then carry the engaged item 206.3 to the point of delivery 302 for this additional customer.

Presuming that the airborne drones 205 are not disposable, the dispatched airborne drones 205, by one approach, can return to their point of embarkation following completion of their delivery. Having arrived at the terrestrial vehicle 204 they can then land on their corresponding platforms 404 following which the platform and the corresponding airborne drone can be returned to the interior of the terrestrial vehicle 204. (If additional items remain to be distributed in the first delivery zone 208, instead of landing on the platform the returning airborne drone can engage another item and deliver that item to the corresponding point of delivery.)

So configured, any number (and kind) of items can be delivered to any number of customers and points of delivery within one or more delivery zones by airborne drones that in many cases will not be required to remain airborne for lengthy periods of time. In many cases, for example, the round-trip for an airborne drone may be less than 200 feet, half a mile, or 1 mile depending upon the relative size of the delivery zone and the location of the terrestrial vehicle within the delivery zone. These relatively brief flights can require, in turn, only modest energy resources. Brief flights may also be looked upon more favorably by relevant regulatory authorities.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. As one example in these regards, one or more of the above-described activities undertaken when the terrestrial vehicle is in the delivery zone can be controlled, in whole or in part, by the above-described control circuit 201. The control circuit 201 itself can be, for example, located within a given terrestrial vehicle 204, at the base facility 207, or elsewhere as desired.

What is claimed is:

1. A method comprising:
   by a control circuit:
   dispatching a terrestrial vehicle that carries at least one airborne drone and at least one item to be delivered to a customer towards a delivery zone;
   when the terrestrial vehicle is in the delivery zone, dispatching the airborne drone to carry the item to the customer by, at least in part:
   when the terrestrial vehicle is in the delivery zone, causing the airborne drone to exit the terrestrial vehicle without the item by opening a portal through a backside of the terrestrial vehicle and moving a platform that supports the airborne drone through the portal such that the airborne drone is fully positioned external to the terrestrial vehicle;
   moving the item from within the terrestrial vehicle to a position such that the item is at least partially exposed external to the terrestrial vehicle;
   when the terrestrial vehicle is in the delivery zone, and after the airborne drone has exited the terrestrial vehicle without the item, causing the airborne drone to engage the item.

2. The method of claim 1 wherein causing the airborne drone to exit the terrestrial vehicle without the item comprises causing the airborne drone to exit the terrestrial vehicle while the terrestrial vehicle is stationary.

3. The method of claim 1 wherein the control circuit is physically remote from the terrestrial vehicle.

4. The method of claim 1 wherein the terrestrial vehicle carries a plurality of airborne drones and a plurality of items to be delivered to a plurality of different customers within the delivery zone.

5. The method of claim 4 wherein dispatching the airborne drone to carry the item to the customer comprises dispatching a first airborne drone to carry a first one of the items to a first customer and dispatching a second airborne drone to carry a second one of the items to a second customer that is different than the first customer.

6. The method of claim 4 wherein dispatching the airborne drone to carry the item to the customer comprises dispatching a first airborne drone to carry a first one of the items to the customer and dispatching a second airborne drone to carry a second one of the items to the same customer.

7. An apparatus comprising:
   a terrestrial vehicle that carries at least one airborne drone and at least one item to be delivered to a customer in a delivery zone, wherein the airborne drone is configured to engage the item after the airborne drone has exited the terrestrial vehicle without the item and wherein the terrestrial vehicle is configured to automatically move the item from within the terrestrial vehicle to a position such that the item is at least partially exposed external to the terrestrial vehicle such that the airborne drone can engage the item;
   a control circuit configured to dispatch the airborne drone to carry the item to the customer when the terrestrial vehicle is in the delivery zone by, at least in part:
   when the terrestrial vehicle is in the delivery zone, causing the airborne drone to exit the terrestrial vehicle without the item by opening a portal through a backside of the terrestrial vehicle and moving a platform that supports the airborne drone through the portal such that the airborne drone is fully positioned external to the terrestrial vehicle.

8. The apparatus of claim 7 wherein the control circuit is configured to cause the airborne drone to exit the terrestrial vehicle without the item by causing the airborne drone to exit the terrestrial vehicle while the terrestrial vehicle is stationary.

9. The apparatus of claim 7 wherein the terrestrial vehicle carries a plurality of airborne drones and a plurality of items to be delivered to a plurality of different customers within the delivery zone.

10. The apparatus of claim 9 wherein the control circuit is configured to dispatch the airborne drone to carry the item to the customer by dispatching a first airborne drone to carry a first one of the items to a first customer and dispatching a second airborne drone to carry a second one of the items to a second customer that is different than the first customer.

\* \* \* \* \*